United States Patent [19]

Subramanian

[11] 3,967,060

[45] June 29, 1976

[54] FAST REFRAMING ARRANGEMENT FOR DIGITAL TRANSMISSION SYSTEMS

[75] Inventor: Mahadevan Subramanian, Fair Haven, N.J.

[73] Assignee: Bell Telephone Laboratories, Incorporated, Murray Hill, N.J.

[22] Filed: July 19, 1974

[21] Appl. No.: 490,064

[52] U.S. Cl. .................... 178/69.5 R; 179/15 BS; 325/41; 340/146.1 D
[51] Int. Cl.² ........................................ H04L 7/00
[58] Field of Search ............ 178/69.5 R; 179/15 BS; 340/146.1 D, 146.1 C; 325/41, 42

[56] References Cited
UNITED STATES PATENTS

| | | | |
|---|---|---|---|
| 3,550,082 | 12/1970 | Tong | 340/146.1 D |
| 3,571,794 | 3/1971 | Tong | 340/146.1 D |
| 3,581,010 | 5/1971 | Kobayashi | 178/69.5 R |
| 3,699,261 | 10/1972 | Tomozawa | 178/69.5 R |
| 3,729,586 | 4/1973 | Chow | 178/69.5 R |
| 3,865,981 | 2/1975 | Welch et al. | 178/69.5 R |

*Primary Examiner*—Charles E. Atkinson
*Assistant Examiner*—Errol A. Krass
*Attorney, Agent, or Firm*—Thomas Stafford

[57] ABSTRACT

Reframing of digital receivers, for example, those employed in D-1 channel banks is enhanced by employing a switch to inhibit reception of transmitted signals and a signal generator to supply a prescribed signal to the receiver during intervals in which reception is inhibited. The frequency of the signal supplied to the receiver is set at a predetermined value so that the framing signal generated in the receiver is maintained in a desired relationship to that of the transmitter. This arrangement presents a definite out-of-frame appearance to the receiver and maintains the framing of the receiver in a prescribed relationship to that of the transmitter during intervals in which received signals have undesirable characteristics.

13 Claims, 4 Drawing Figures

FAST REFRAMING ARRANGEMENT FOR DIGITAL TRANSMISSION SYSTEMS

BACKGROUND OF THE INVENTION

This invention relates to digital communication systems and, more particularly, to synchronization of digital receivers with their associated digital transmitters.

Among the advantages of certain digital communications systems is the ease with which a plurality of information channels can be multiplexed by time division in an array of periodically recurrent time slots or frames. This advantage, however, is not without problems, for transmitters and receivers utilized in such multiplex systems must be maintained in substantially perfect synchronism in order to reconstruct messages correctly. Synchronization of a transmitter and an associated receiver has become known as framing. To this end, it is known to transmit a distinctive pulse pattern in order to maintain the receiver in frame with the transmitter. In many systems, a recurring pulse-no-pulse pattern is employed. It is also very desirable that the receiver rapidly return to an in-frame condition with the transmitter after momentary interruptions in service or any other occurrence that results in a temporary out-of-frame condition. The process of returning to an in-frame condition has become known as reframing.

It has been the usual practice heretofore to employ so-called backward acting reframing systems. The backward acting system is one in which an in-frame condition is obtained and a check is made in each frame to ascertain whether the in-frame condition subsists. To this end, the received signal is compared in a framing detector with a locally generated framing signal pattern. When this comparison indicates a number of rapidly occurring differences between the received framing pattern and the local framing pattern, a hunting action is initiated in order to reframe. In one existing system, an additional pulse is inserted into the local framing signal in each frame which allows the local framing signal to slip a bit each frame relative to the incoming signal. Thus, the local framing signal is compared with each bit position, in turn, of the incoming signal until a comparison is achieved. When the received and locally generated patterns match, the system is in-frame and the hunting action is terminated.

Evaluations of backward acting reframing systems presently in commercial use have indicated that the reframing process requires a substantial period of time. Specifically, it has been determined that in D-1 channel bank receivers the average reframing cycle takes approximately 25 milliseconds. These evaluations have also indicated that many out-of-frame conditions or misframe events are caused by clusters of impulse noise bursts. The individual noise bursts tend to be separated by a time interval comparable to the time required to reframe. A noise burst occurring during the reframing sequence reinitiates the reframing process. Thus, a cluster of noise bursts tends to keep the receiver out-of-frame for a prolonged period. Prolonged out-of-frame periods may cause, among others, noise, service disconnects, system shut downs and the like. Therefore, it is desirable to reframe in the intervals between individual noise bursts.

Another problem with digital receivers utilizing backward acting reframing systems concerns the so-called mass seizure of telephone switching apparatus. During high density error intervals, a bit may be removed from or added into the digital bitstream being supplied to digital receivers associated with a particular telephone switching apparatus. This may cause the framing in all of the receivers to slip in a direction that causes the reframing process in each receiver to sequence through all of the bits in a frame prior to reestablishing an in-frame condition. In some existing receivers, this process would require on average up to approximately 52 milliseconds. Thus, all of the receivers associated with a particular switching apparatus would be out-of-frame for this period. This en masse out-of-frame condition tends to present a so-called off-hook appearance for all channels which, in turn, overloads the switching apparatus, causing it to go out of service. Consequently, all subscribers being serviced by the switching apparatus are disconnected. Such an occurence is extremely undesirable.

SUMMARY OF THE INVENTION

It is, therefore, a primary object of this invention to shorten the time required to reframe in digital receivers.

It is another object of this invention to realize rapid reframing in existing digital receivers with a minimum of modification.

It is yet another object of this invention to minimize the possibility of reinitiating the reframing process during intervals of recurring noise bursts.

It is still another object of this invention to reframe in such a manner so as to eliminate substantially the possibility of mass seizures of switching apparatus.

These and other objects are accomplished in accordance with the inventive principles herein to be described in relation to digital receivers utilizing so-called backward acting reframing systems.

In accordance with one aspect of this invention, rapid reframing is realized by causing a definite out-of-frame condition at the receiver so that the receiver cycles through the reframing process continuously and by causing the period of the locally generated reframing signal to be substantially equal to but slightly less than the period of a frame of the normally transmitted signal. Said another way, the receiver is caused to complete each reframing cycle within the time interval of each transmitted frame. Consequently, upon restoring reception, the receiver is substantially in synchronism with its associated transmitter and the normal reframing hunting action rapidly yields an in-frame comparison. More specifically, rapid reframing is achieved, in accordance with this invention, by controllably inhibiting reception and by supplying a signal having a prescribed frequency to a digital receiver during intervals in which the normally transmitted signal deviates from "normal". The frequency of the supplied signal is set at a value greater than and in a predetermined relationship to the frequency of the normally transmitted signal so that the period of the locally generated reframing signal is substantially equal to but slightly less than the period of a frame of the transmitted signal. Reception is inhibited and a signal supplied to the receiver until the transmitted signal is restored to "normal."

In accordance with another aspect of this invention, rapid reframing of a digital receiver is realized by inhibiting reception of a transmitted signal and by supplying a signal having a prescribed frequency to the receiver for a predetermined fixed interval. The frequency of the supplied signal is set at a value greater than and in a predetermined relationship with the frequency of the normally transmitted signal so that the framing signal generated in the receiver slips a predetermined number of bits during the fixed interval in a so-called positive sense relative to the framing of an associated transmitter. The fixed interval is initiated upon detection of a prescribed received signal condition, for example, a single out-of-frame indication. At the termination of the fixed interval, reception of the normally transmitted signal is restored and the normal reframing hunting action need only slip through the number of bits slipped in a positive sense before an in-frame comparison is obtained.

In accordance with still another aspect of this invention, rapid reframing of a digital receiver is realized by inhibiting reception of a transmitted signal during intervals of prescribed signal characteristics for at least a fixed interval and restoring reception only after the transmitted signal is restored to a "normal" condition. During the interval in which reception in inhibited, a prescribed signal is supplied to the receiver having a predetermined frequency so that a locally generated framing signal slips in a predetermined sense relative to the framing of the transmitted signal.

BRIEF DESCRIPTION

These and other objects and advantages of the invention will be more fully understood from the following detailed description taken in conjunction with the appended drawings wherein.

DETAILED DESCRIPTION

Figure 1:
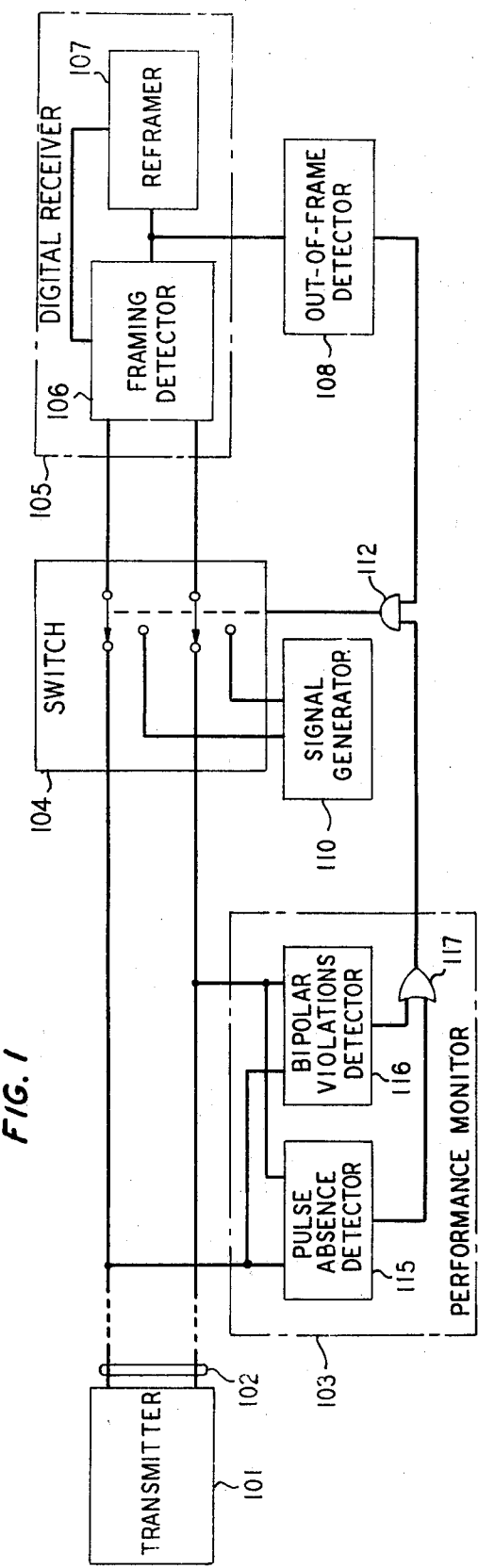
FIG. 1 depicts a system illustrating one embodiment of the invention.

FIG. 1 depicts in simplified block diagram form a system illustrating one aspect of this invention useful to enhance reframing in digital receivers of the type including backward acting reframing arrangements. Accordingly, transmitter 101 generates digital signals at a prescribed frequency or bit rate, for example 1.544 megabits per second (Mbps), which are grouped into an array of periodically recurrent time slots or frames. Individual frames of the signal are denoted by a so-called framing bit. A frame may include any number of bits. For example, some existing digital transmitters generate a digital signal having 193 bits per frame. Usually, 192 bits are data and the 193rd bit is the framing bit. Although numerous patterns may equally be employed to check framing, a recurrent pulse-no-pulse framing pattern has achieved widespread use.

Digital signals generated in transmitter 101 are transmitted at a predetermined bit rate over a communications link or the like, for example, transmission line 102 to performance monitor 103 and via controllable switch 104 to digital receiver 105.

Receiver 105 may be one of several digital receivers presently in wide commercial use which employ so-called backward acting reframing arrangements. Receiver 105 includes, among other components, framing detector 106 and reframer 107. Framing detector 106 is employed to compare a locally generated framing signal to the framing pattern of the normally transmitted incoming signal. To this end, it includes a slave oscillator (not shown) which responds to the incoming signal for the purpose of generating, among others, the local framing signal. Upon detection of rapidly occurring differences in the comparison, framing detector 106 generates a signal representative of an out-of-frame condition. This signal is supplied to reframer 107 and out-of-frame detector 108. For further discussion of a digital transmitter and receiver now in wide commercial use see "The T1 Carrier System" *Bell System Technical Journal*, September 1965, beginning at page 1405.

Reframer 107 responds to the out-of-frame signal from framing detector 106 to initiate a hunting action in order to re-establish synchronism with transmitter 101. In one existing receiver, reframer 107 causes an additional pulse signal to be inserted in each frame of the locally generated framing signal so that the locally generated framing pattern "slips" one bit per frame relative to the normally transmitted signal. Thus, the local reframing signal, in this example, includes 194 bits per frame or one more bit than the transmitted signal. This additional bit allows the local framing pattern to slip in a backward direction or negative sense relative to the incoming signal until a comparison is made with the received framing pattern at which time the hunting action is terminated.

Depending on the type of interruption or disturbance in the incoming signal which has caused the out-of-frame condition, it is possible that the receiver would have to cycle through all of the bits in a frame before achieving an in-frame comparison. In some existing receivers, this process requires an average of approximately 52 milliseconds. Additionally, some disturbances, for example, clusters of noise bursts or the like, include individual noise bursts which occur at intervals approximately equal to the reframing interval. These noise bursts tend to cause the reframing process to be reinitiated. Consequently, clusters of recurring noise bursts tend to cause the receiver to be held in an out-of-frame condition for prolonged periods. Such occurrences are highly undesirable because of deleterious affects on communications transmission, for example, audible clicks on voice channels, error bursts on data channels, signaling pulse errors, local and intertoll disconnects and the like.

Prolonged out-of-frame intervals are minimized and rapid reframing is realized, in accordance with one aspect of this invention, by employing switch 104 controllably to inhibit reception of signals from transmission line 102 and to supply a prescribed signal from generator 110 to receiver 105 during intervals in which reception is inhibited.

Switch 104 is rapidly operated to inhibit reception of transmitted signals and to supply signals from generator 110 to receiver 105 during intervals in which prescribed undesirable incoming signal conditions and an out-of-frame condition in receiver 105 occur concurrently. To this end, output signals from monitor 103 and out-of-frame detector 108 are supplied to coincidence gate 112. Gate 112 may be any one of a number of coincidence gates now well known in the art. In this example, an AND gate is employed to yield an output during those intervals in which the outputs from monitor 103 and out-of-frame detector 108 occur concurrently. The output from gate 112 is supplied to control switch 104. It is important to note that switch 104 must open extremely rapidly in response to signals denoting such occurrences. The specific switching time is somewhat dependent on the transmission rate. In a system employing a transmission rate of 1.544 Mbps, a switching time of approximately one microsecond is adequate. This insures that signals from generator 110 are rapidly supplied to receiver 105 thereby maintaining receiver 105 substantially in synchronism with transmitter 101. Transmission line 102 is terminated in its characteristic impedance (not shown) during intervals that switch 104 is opened. This allows for satisfactory operation of performance monitor 103 and an office repeater (not shown). Although a double-pole double-throw switch is described here for inhibiting reception of signals, other arrangements including gating and/or inhibiting apparatus could equally be employed for this purpose. Switches or other similar gating apparatus which may be employed in the practice of this invention are commercially available in the so-called solid state dual in-line package arrangements now well known in the art.

Generator 110 is operated continuously to insure rapid supply of a signal at a stable frequency to receiver 105. Frequency stability is important to insure that the local framing of receiver 105 slips in a proper direction relative to that of transmitter 101. In one example, generator 110 is an "all ones" generator which insures that a definite out-of-frame condition is presented to receiver 105. The frequency of signal generator 110 is set at a value so that each "frame" of the local reframing signal is generated in a time interval equal to that of a frame of a normal incoming signal. In an example from practice, in which the framing pattern contains a bit position in each frame, the frequency of generator 110 is set at a value slightly greater than the sum of the normal transmission rate plus the sampling rate. This insures that the local reframing signal slips in a so-called positive sense relative to the normally incoming signal. Thus, in a system which, for example, has 193 bits per incoming frame and a transmission rate of 1.544 megabits per second (Mbps), the frequency of signal generator 110 is set at a value slightly greater than 1.552 megahertz (MHz). Consequently, the 194 bit reframing "frame" is generated in an interval slightly less than the time period of the 193 bit transmitted frame. In turn, this insures a rapid reframing comparison once the disturbance has terminated and normal reception is restored.

In some existing digital receivers, for example, those employed in D-2 and D-3 channel banks, the pulse-no-pulse pattern occurs during every other frame. That is, framing is checked every other frame. Additionally, the framing bits are checked in groups of eight rather than on an individual basis as in D-1 channel banks. Therefore, for D-2 and D-3 channel banks the frequency of generator 110 is set at a value which causes a positive slip in the local framing signal of eight bits over two frames. Thus, generator 110 is set to a frequency slightly greater than the transmission rate plus four times the sampling rate or 1.576(+) megahertz (MHz). The 1.576(+) MHz signal yields a slip of four bits per frame and the desired eight bits every second frame. Thus, generator 110 generates a signal having an appropriate format corresponding to the transmitted signal format and reframing scheme used in the receivers.

As stated above, performance monitor 103 is employed to detect the presence of undesirable incoming signal conditions. In this example, monitor 103 includes pulse absence detector 115 and bipolar violations detector 116. Pulse absence detector 115 yields a predetermined output, for example, a signal representative of a logical 1, indicative that no pulse has been present in the incoming digital signal for a prescribed number of bits. Similarly, bipolar violations detector yields a predetermined output during intervals in which bipolar violations in the incoming signal exceed a predetermined threshold level. Outputs from detectors 115 and 116 are supplied via OR gate 117 to one input of AND gate 112. Other arrangements may be equally employed to detect intervals of undesirable signal characteristics. The particular monitor arrangement used in each application being dependent to some extent on the transmitted signal format. Performance monitor arrangements which may be employed in the instant invention are now believed well known in the art. One such monitor is described in an article entitled "Monitors Take the Pulse of T-1 Transmission Lines" *Bell Laboratories Record*, February, 1973 beginning at page 55.

Figure 2:
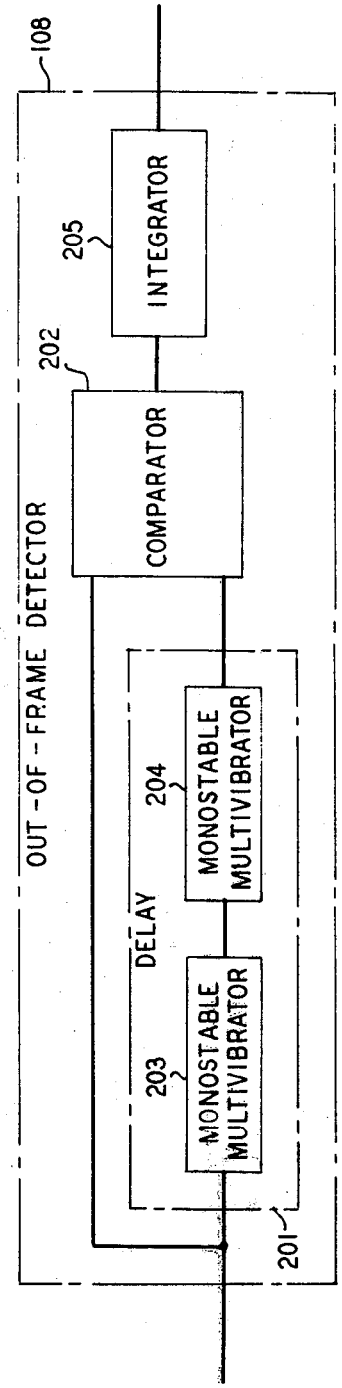
FIG. 2 shows details of an out-of-frame detector employed in the system of FIG. 1.

Out-of-frame detector 108 is employed to detect accurately the instant that receiver 105 has gone out-of-frame and to generate a predetermined signal for the duration of the out-of-frame condition. Although detector 108 is shown external to receiver 105, it could readily be incorporated into framing detector 106. Details of one circuit arrangement which may be employed for this purpose are shown in FIG. 2. Again, it is extremely critical that the instant receiver 105 goes out-of-frame be detected so that reception is rapidly inhibited and the signal from generator 110 is rapidly supplied to receiver 105 in order to maintain receiver 105 substantially in synchronism with transmitter 101.

Some existing receivers, for example, those employed in D-1 channel banks generate the local framing signal by employing a so-called inhibit drive circuit (not shown). The inhibit drive circuit generates a signal which is utilized to inhibit or delay the incoming data signal for one bit position after a prescribed number of data bits have been received in a frame. This delays the data signal and allows for the insertion of a framing bit. In D-1 channel banks, the incoming signal is inhibited after every 192nd data bit. During an out-of-frame condition an additional bit is inserted during each frame so that the locally generated reframing signal may slip one bit per frame relative to the incoming signal. This additional bit is inserted by inhibiting the data signal by an additional bit position. Thus, when receiver 105 (FIG. 1) goes out-of-frame, the inhibit interval is increased. Out-of-frame detector 108 (FIG. 2) detects this increase in the inhibit interval.

Accordingly, the inhibit drive signal from receiver 105 (FIG. 1) is supplied to delay 201 (FIG. 2) and to one input of comparator 202. Delay 201 may be any one of numerous circuit arrangements well known in the art which are capable of generating an output at a predetermined interval after an input has been supplied thereto. In this example, monostable multivibrators 203 and 204 are utilized to obtain a desired delay interval. Monostable 203 responds to the leading edge of the inhibit drive signal to generate a pulse signal having a width slightly greater than the width of the normal inhibit signal. Monostable 204 responds to the trailing edge of the output from monostable 203 to generate a delayed version of the applied signal. The output of monostable 204 is supplied to a second input of comparator 202. Comparator 202 may also be any one of the coincident circuit arrangements now well known in the art which yield an output change of state in response to the concurrent application of predetermined signal conditions at its inputs. During intervals when receiver 105 (FIG. 1) is in-frame, the inhibit signal terminates before monostable 204 (FIG. 2) has been triggered. Consequently, comparator 202 does not yield an output pulse. However, when receiver 105 (FIG. 1) is out-of-frame, the duration of the inhibit signal is increased and is still present when monostable 204 is triggered by the output of monostable 203. In such event, comparator 202 yields an output pulse which is supplied to integrator 205. Integrator 205 is employed to yield an output pulse having a width representative of the duration that receiver 105 is out-of-frame. Again, any one of numerous circuit arrangements known in the art may be employed for this purpose. In this example, a so-called retriggerable monostable multivibrator is utilized to yield the desired output pulse. The normal unstable time interval of the retriggerable monostable multivibrator is set at a value so that the monostable is retriggered prior to timing out during successive out-of-frame intervals. That is, integrator 205 is retriggered during each frame that receiver 105 is out-of-frame, thereby yielding a high state signal for the entire out-of-frame interval.

In summary, the invention as illustrated in FIG. 1 operates to enhance rapid reframing of a digital receiver by rapidly inhibiting reception of incoming signals to present a definite out-of-frame condition to the receiver and by rapidly supplying a signal to the receiver so that the locally generated reframing signal cycles continuously through each cycle of its slipping routine in the time interval of the normally transmitted frame. To this end, performance monitor 103 monitors transmission line 102 to detect intervals of undesirable signal conditions. Upon detection of such a condition, a high state signal is supplied to one input of AND gate 112. If the signal condition has caused receiver 105 to go out-of-frame, out-of-frame detector 108 also yields a high state signal which is supplied to a second input of AND gate 112. Consequently, gate 112 is enabled which, in turn, operates switch 104 to inhibit reception from line 102 and to supply signals from generator 110 to receiver 105. This condition continues until the incoming signal has returned to normal at which time the output from monitor 103 returns to a low state disabling gate 112, thereby operating switch 104 to enable reception from line 102 and disconnect generator 110.

Rapid reframing is realized in this embodiment of the invention because receiver 105 is maintained substantially in synchronism with transmitter 101 during intervals in which undesirable signal conditions exist. Since receiver 105 was in synchronism with transmitter 101 just prior to detection of the undesirable signal conditions, and since the timing of receiver 105 is caused to slip slightly in a so-called positive sense relative to the framing of the transmitter 101, receiver 105 remains substantially in-frame with transmitter 101. Consequently, upon restoration of reception, the reframing hunting action in receiver 105 is kept to a minimum and the receiver is rapidly reframed with transmitter 101. Experimental tests of this invention relating to D-1 channel banks have indicated that the average reframing time has been reduced to less than one millisecond.

Figure 3:
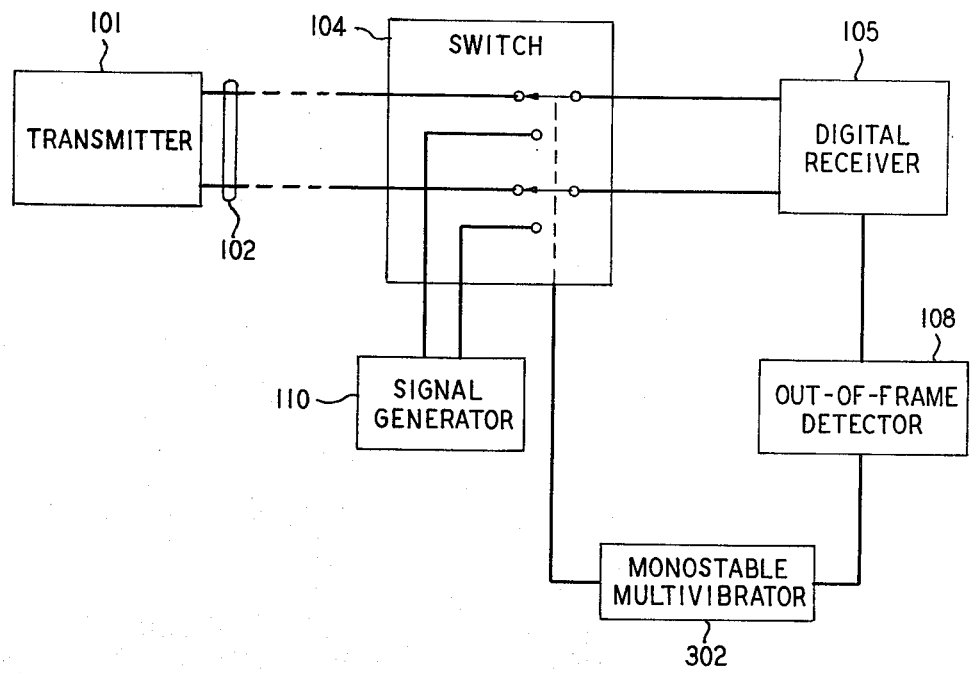
FIG. 3 depicts a system illustrating a second embodiment of the invention.

FIG. 3 depicts in simplified block diagram form a system illustrating a second embodiment of this invention also useful in enhancing reframing in digital receivers of the type including backward acting reframing arrangements. In particular, the embodiment shown in FIG. 3 is directed toward minimizing the possibility of mass seizure of switching apparatus while obtaining rapid reframing. System components which perform the same function as those shown in FIG. 1 have been similarly numbered and will not again be described in detail.

As noted above, under certain circumstances, a bit may be removed from or added into the digital bitstreams being supplied to all of the receivers associated with a particular switching apparatus. Such an occurence creates an appearance to the switching apparatus that all incoming channels have gone off-hook. This en masse off-hook appearance overloads the switching apparatus causing it to go out of service. The possibility of such a mass seizure of switching apparatus is minimized, in accordance with this invention, by employing switch 104 (FIG. 3) in conjunction with monostable 302 and signal generator 110 to inhibit reception from and to supply a signal having a predetermined frequency to receiver 105 for a prescribed fixed time interval. Monostable multi-vibrator 302 responds to the output from out-of-frame detector 108 to generate a prescribed output for the desired fixed time interval. The output from monostable 302 is supplied to control switch 104. Thus, switch 104 responds to the output from monostable 302, for example a high state signal, rapidly to disconnect line 102 from and connect signal generator 110 to receiver 105. Again, it is emphasized that switch 104 switches extremely rapidly, in the order of approximately one microsecond, to insure that the framing in receiver 105 slips in a positive direction relative to the framing of transmitter 101.

The unstable timing interval of monostable 302 and the frequency of signal generator 110 determine the number of bits that the framing of receiver 105 slips in a positive sense relative to the framing of transmitter 101. Further, the timing interval of monostable 302 is dependent upon the time required to access a particular switching apparatus. Thus, the unstable time interval of monostable 302 is necessarily adjusted to correspond to a particular associated switching apparatus. In one example, for D-1 channel banks and most existing telephone switching apparatus, the unstable interval of monostable 302 is set at 3 milliseconds and the frequency of generator 110 is set at 1.554 megahertz. These values insure that the framing of receiver 105 slips approximately two bits in a positive sense relative to the framing of transmitter 101. Stated generally, for D-1 channel banks, slippage of the local framing signal in a positive sense is one bit per millisecond per kilobit above 1.552 Mbps, where 1.552 Mbps is equal to the sum of the transmission bit rate plus the sampling rate, namely, 1.544 Mbps plus 8 Kbps. When monostable 302 times out and the fixed interval is terminated, switch 104 rapidly reconnects transmission line 102 to receiver 105 and disconnects signal generator 110.

Upon restoration of reception via switch 104, the "normal" reframing hunting action is resumed and reframing is rapidly realized because receiver 105 need only cycle through two frames before an in-frame comparison is detected. That is, upon restoration of reception of signals from line 102 the local framing signal need only slip two bits in a negative sense to obtain a comparison wth the incoming framing pattern. Consequently, the possibility of having to cycle through all of the bits in a frame has been eliminated and, hence, the possibility of mass seizure of an associated switching apparatus has been minimized.

Figure 4:
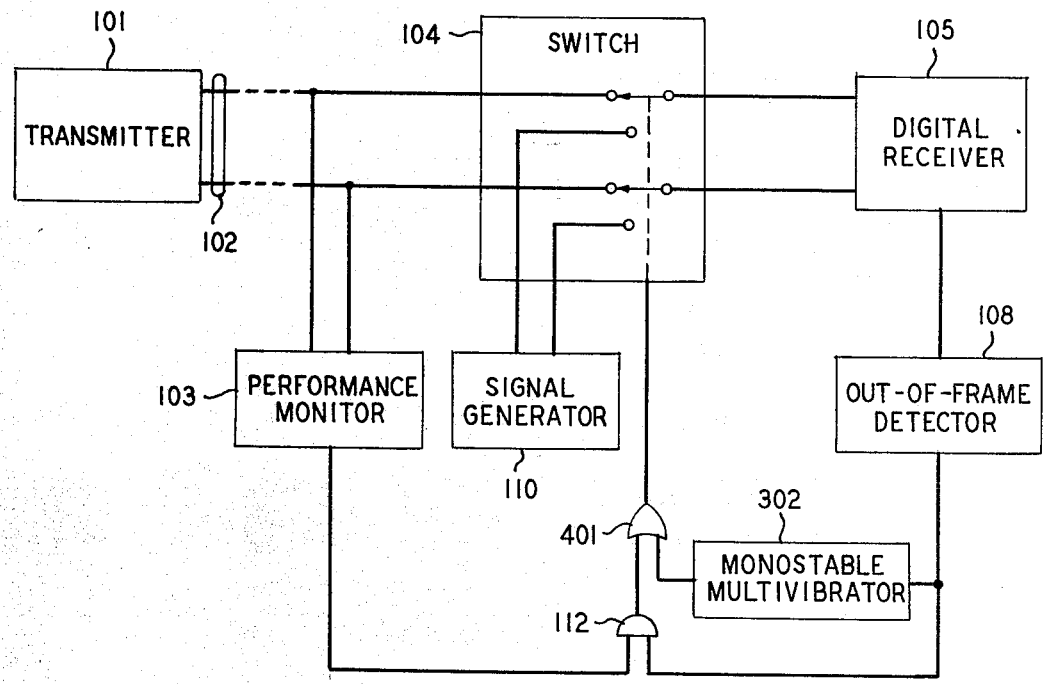
FIG. 4 shows a system illustrating a third embodiment of the invention.

FIG. 4 shows in simplified block diagram form another embodiment of this invention useful for enhancing reframing in digital receivers of the type including backward acting reframing arrangements. System components which perform the same function as those depicted in FIGS. 1, 2 and 3 have been similarly numbered and will not again be explained in detail.

The embodiment of the invention shown in FIG. 4 includes a combination of the features previously described in relation to FIGS. 1, 2 and 3. Thus, the system shown in FIG. 4 operates to enhance reframing by selectively inhibiting reception via switch 104 and by supplying a prescribed signal via signal generator 110 to receiver 105 for at least a fixed time interval in response to detection of an out-of-frame condition in receiver 105 by out-of-frame detector 108. However, reception is restored only upon the output from performance monitor 103 indicating that the undesirable signal condition on transmission line 102 which caused the out-of-frame condition of receiver 105 has terminated. Control of switch 104 is effected by supplying the output from monostable 302 and the output from AND gate 112 via OR gate 401. Operation of monitor 103 in conjunction with out-of-frame detector 108 is identical to that described above in relationship to FIG. 1. Similarly, operation of monostable 302 in conjunction with the output of out-of-frame detector 108 is identical to that described above in relation to the system of FIG. 3. Signal generator 110 supplies a signal at a stable frequency which causes the locally generated framing in receiver 105 to slip in a positive sense relative to that of transmitter 101 in a manner essentially the same as that described in conjunction with FIG. 3. Thus, if reception is inhibited by switch 104 only for an interval equal to the unstable interval of monostable 302, the local framing signal slips a predetermined number of bits in a positive sense relative to transmitter 101. However, if a disturbance is present on line 102 which causes monitor 103 to still yield an output after monostable 302 has timed out, reception is still inhibited and a signal supplied from generator 110 via switch 104 in response to the outputs from monitor 103 and out-of-frame detector 108, which are supplied via AND gate 112 and OR gate 401. In such event, the number of bits which the local framing signal slips in a positive sense is determined by the total time interval that reception is inhibited and the frequency of signal generator 110. For D-1 channel banks, the number of bits slipped is one bit per millisecond per kilobit above the transmitter bit rate plus the sampling rate.

Again, upon restoration of reception from line 102 via switch 104, the normal reframing hunting action resumes in receiver 105 and reframing is realized once the local framing signal has slipped a number of bits approximately equal to the number of bits which have been slipped in a positive sense during the interval in which reception has been inhibited. Since disturbances which cause out-of-frame conditions are usually of relatively short duration, intervals in which reception is inhibited will usually be equal to the unstable interval of monostable 302. However, should a disturbance or signal condition which would cause an out-of-frame condition to be present at the time monostable 302 times out, the outputs from monitor 103 and out-of-frame detector 108 are supplied via AND gate 112 and OR gate 401 to switch 104 thereby causing reception to remain inhibited and a signal from generator 110 to still be supplied to receiver 105. Therefore, framing of receiver 105 is always caused to slip in a positive sense during out-of-frame conditions and the possibility of having to cycle through all the bits in a frame prior to obtaining an in-frame comparison is eliminated.

Since some existing digital receivers, for example, those employed in D-2 and D-3 channel banks check framing in somewhat of a different manner than D-1 channel banks, the frequency of signal generator 110 would have to be adjusted appropriately in order to cause the associated receiver to slip a proper number of bits per frame.

The above described arrangements are, of course, merely illustrative of the application of the principles of this invention. Numerous other arrangements may be devised by those skilled in the art without departing from the spirit and scope of the invention. For example, numerous digital receivers known in the art have internal oscillator circuits which may be tuned to self oscillate at a desired frequency in order to generate the local framing signal at the desired frequency to obtain the results of this invention.

What is claimed is:

1. In a digital receiver of the type including backward acting reframing apparatus and employed to receive digital signals transmitted at a prescribed bit rate and having a prescribed framing pattern, the improvement comprising:

means for enhancing reframing of the digital receiver including, means for controllably inhibiting reception of incoming signals and for supplying a signal to the receiver during intervals in which reception is inhibited, said supplied signal having a frequency greater than the digital transmission rate and having an appropriate format related to the framing pattern of the transmitted digital signals normally being received so that the period of a reframing signal generated in the digital receiver is controlled to be substantially equal to but slightly less than the period of a frame of the transmitted signal normally being received.

2. Apparatus for enhancing reframing of a digital receiver including backward acting reframing apparatus which comprises:

means for generating a signal having a prescribed frequency greater than the transmission rate of the digital signals normally incoming to the receiver; and controllable means for inhibiting reception of normally incoming signals to the receiver and for supplying said generated signal to the receiver during intervals in which reception is inhibited, wherein the supplied signal maintains the period of a framing signal generated in the digital receiver to be substantially equal to but slightly less than the period of a frame of the normally transmitted signal incoming to the receiver.

3. Apparatus as defined in claim 2 wherein said controllable means includes means for detecting intervals of undesirable incoming signal characteristics and controllable switch means responsive to signals from said detecting means for inhibiting reception of the incoming signals and for supplying the generated signal to the receiver.

4. Apparatus for enhancing reframing of a digital receiver of the type including backward acting reframing apparatus which comprises:

means for generating a signal having a prescribed frequency;

means for detecting intervals of undesirable characteristics of signals incoming to the receiver, said detecting means including means for yielding a predetermined output signal during intervals that the digital receiver is out-of-frame; and controllable switch means responsive to signals from said detecting means for inhibiting reception of the incoming signals and for supplying said generated signal to the receiver during intervals in which reception is inhibited, wherein the supplied signal maintains the timing of the digital receiver in a desired relationship to the timing of the normally transmitted signal incoming to the receiver.

5. Apparatus as defined in claim 4 wherein said detecting means further includes means for generating a predetermined output signal during intervals in which the incoming signals are characterized by undesirable characteristics.

6. Apparatus as defined in claim 5 wherein said controllable means further includes means responsive to said predetermined outputs for generating a signal to operate said switching means to inhibit reception and supply said generated signal to the receiver only during intervals that said predetermined outputs occur concurrently.

7. Apparatus as defined in claim 5 wherein said undesirable incoming signal characteristic detecting means includes a pulse absence detector and a bipolar violations detector.

8. Apparatus for enhancing reframing of a digital receiver of the type including backward acting reframing apparatus comprising:

means for generating a signal having a prescribed frequency;

means responsive to a prescribed condition of the digital receiver for generating a predetermined control signal for at least a prescribed interval; and controllable switch means responsive to said control signal for inhibiting reception of incoming signals and for supplying said generated signal to the receiver for said prescribed interval, wherein the framing of the digital receiver is caused to be in a desired relationship to that of the normally transmitted incoming signal upon termination of said prescribed interval.

9. Apparatus as defined in claim 8 wherein said control signal generating means includes means for detecting when the digital receiver goes out-of-frame and means for generating said control signal in response to an output from said out-of-frame detecting means.

10. Apparatus as defined in claim 9 wherein said controllable means further includes means for detecting intervals of undesirable characteristics of said incoming signals, and means responsive to an output from said undesirable characteristics detecting means, to said control signal and to said out-of-frame signal for generating a signal for controlling said switch means to inhibit reception and to supply said generated signal to the receiver for at least said prescribed interval and for intervals that the undesirable incoming signal characteristics subsist.

11. In a digital receiver of the type employed to receive digital signals transmitted at a prescribed bit rate and having a prescribed framing pattern including backward acting reframing apparatus, apparatus for enhancing reframing of the digital receiver which comprises:

means for generating a signal having a prescribed frequency related to the digital transmission rate and transmitted framing pattern;

means for detecting intervals of undesirable incoming signal characteristics and for generating a first control signal during said intervals;

means for detecting intervals that said digital receiver is out-of-frame and for yielding a second control signal during said intervals; and controllable means responsive to said first and second control signals for inhibiting reception of incoming signals to the receiver and for supplying said generated signal to the receiver during intervals that said control signals occur concurrently.

12. Apparatus as defined in claim 11 further including means responsive to said second control signal for generating a third control signal, said third control signal being supplied to said controllable means for enabling said controllable means to inhibit reception and to supply said generated signal to the receiver for at least a prescribed interval.

13. Apparatus as defined in claim 12 wherein said first control signal generating means includes at least pulse absence detector means and bipolar violations detector means, said second control signal generating means includes time interval detector means and integrator means, and said third control signal generating means includes timing circuit means responsive to said second control signal for generating said third control signal for a prescribed interval.

* * * * *